United States Patent [19]

Matsuki

[11] Patent Number: 4,999,404

[45] Date of Patent: Mar. 12, 1991

[54] MONOMER RESIN

[75] Inventor: Taketo Matsuki, Nishinomiya, Japan

[73] Assignee: Sumitomo Rubber Industries, Ltd., Hyogo, Japan

[21] Appl. No.: 67,790

[22] PCT Filed: Oct. 3, 1985

[86] PCT No.: PCT/JP85/00545

§ 371 Date: Jun. 3, 1987

§ 102(e) Date: Jun. 3, 1987

[87] PCT Pub. No.: WO87/02039

PCT Pub. Date: Apr. 9, 1987

[51] Int. Cl.$^5$ ................................................ C08F 8/44
[52] U.S. Cl. ................................ 525/329.6; 524/556; 525/330.6; 525/369
[58] Field of Search .................. 525/329.6, 330.6; 524/556

[56] References Cited

U.S. PATENT DOCUMENTS 4,526,375  7/1985  Nakade ............................... 525/201

FOREIGN PATENT DOCUMENTS 509365  12/1979  Australia.
525765   3/1980  Australia.

OTHER PUBLICATIONS

"Fibres, Films, Plastics and Rubber", p. 19, Butterworth, 1975.
"Encyclopedia of Polymer Science and Technology", pp. 384 and 413, published by Interscience, 1968.

*Primary Examiner*—Bernard Lipman
*Attorney, Agent, or Firm*—Birch, Stewart, Kolasch & Birch

[57] ABSTRACT

The present invention provides an ionomer resin prepared by additionally neutralizing 2 to 30% of free carboxyl groups with magnesium hydroxide. According to the present invention, physical properties of the sodium neutralized ionomer resin are improved.

5 Claims, 1 Drawing Sheet

MONOMER RESIN

DESCRIPTION

1. Technical Field

The present invention relates to an ionomer resin which is modified by additionally neutralizing with magnesium free carboxyl groups in an ionomer resin which has been neutralized with sodium.

2. Background Art

Ionomer resins are polymers having ion crosslinking in their chemical constitution. The ionomer resins are generally used for cover material for rubber articles, wrapping material, the sole of ski boots, car bumpers and the like, because of the excellent toughness and high resilience exhibited thereby.

The ionomer resins may be industrially prepared by a solution method (see Japanese Patent Publication (examined) Nos. 6810/1964 and 31556/1974). Japanese Patent Publication (examined) Nos. 15769/1967 and 38441/1983 also disclose a method using an extruder. In the above mentioned methods for preparing the ionomer resins, a copolymer of an α-olefin with an α,β-ethylenically unsaturated carboxylic acid or an ester thereof is neutralized with a metal ion, such as sodium ion, zinc ion and the like.

The ionomer resin neutralized with a sodium ion (hereinafter referred to as "sodium neutralized ionomer resin") is superior to the zinc or magnesium neutralized ionomer resin in rebound properties, but has poor durability at a low temperature, which brings about cracking at a temperature of less than $-5\,°C$. In order to avoid the above defects, a method is proposed wherein the sodium neutralized ionomer resin is blended with the zinc neutralized ionomer resin. However, since the type of the ionomer resin to be blended is very limited, it is difficult to apply the product to a wide variety of products. Another ionomer resin containing both zinc ion and magnesium ion is proposed in Japanese Patent Publication (examined) No. 38441/1983. This ionomer resin has excellent durability at a low temperature, but has poor rebound properties. This ionomer resin is prepared by using a combination of a water-insoluble metal compound, such as zinc oxide, magnesium oxide, magnesium hydroxide and the like, with a volatile organic acid salt, such as zinc acetate, magnesium formate and the like. The volatile organic acid salt, however, corrodes the screw of an extruder and therefore the method is not preferred in an industrial application.

U.S. Pat. No. 4,526,375 discloses a method in which a sodium neutralized ionomer resin is further neutralized with magnesium oxide. The ionomer resin prepared by this method has fairly good physical properties, such as durability at a low temperature. In the process of preparing the ionomer resin, magnesium oxide remains in the obtained ionomer resin without participating in the neutralizing reaction. The nonreacted magnesium oxide is reacted with the ionomer resin when the resin is heated to an elevated temperature in the preparation of the final product. Reaction water is also evolved during the reaction and results in the poor durability of the final product. In order to avoid the defects, it is required to complete the reaction in the preparation of the ionomer resin and it takes a long time.

DISCLOSURE OF INVENTION

The inventors of the present invention have found a new preparation of an ionomer resin. The preparing process is easily carried out using a screw-type extruder and provides an ionomer resin having excellent durability at low temperature.

Thus, the present invention provides an ionomer resin prepared by additionally neutralizing 2 to 30% of the free carboxyl groups of a sodium neutralized ionomer resin with magnesium hydroxide.

The sodium neutralized ionomer resin employed in the present invention can be a thermoplastic resin prepared by copolymerizing 96 to 70% by weight of a monoolefin with 4 to 30% by weight of an unsaturated mono or dicarboxylic acid having 3 to 8 carbon atoms or an ester thereof (% is based on total weight of monomer), and neutralizing with sodium.

The sodium neutralized ionomer resins are available from Mitsui Du Pont Polychemical Company as HI-MILAN, for example, HI-MILAN 1601, 1605 and 1707.

Neutralization with magnesium hydroxide is carried out by mixing the sodium neutralized ionomer resin and magnesium hydroxide by using a roll, a banbury type mixer and an extruder. The extruder is more preferred because the ionomer resin has an tendency to adhere the metal surface in the roll or banbury type mixer.

A neutralizing reaction of the free carboxyl group with the magnesium ion may be confirmed by an infrared spectrum in which an absorption of $1,700\ cm^{-1}$ based on —COOH in the ionomer resin is weakened, an absorption of $1,560\ cm^{-1}$ based on —COOM (M=Na, Mg) becomes strong and an absorption of $1,600\ cm^{-1}$ based on —COOMg appears.

When the neutralizing reaction is finished, the resin turns to transparent from white. The ionomer resin after completion of the reaction has a reduced melt index. It is also confirmed by an X-ray micro analyzer that the magnesium ion is uniformly dispersed in the ionomer resin.

Magnesium hydroxide is consumed in a short period of time by the reaction and therefore raises no corrosion problems with regard to a screw cylinder and the like.

When many magnesium compounds are studied by the inventors, it has been found that there are noticeable differences between magnesium compounds in their reactivity. The reactivity of the magnesium compounds is in the order of magnesium acetate > magnesium hydroxide > magnesium oxide. The magnesium acetate is not preferred because of corrosion properties and the magnesium oxide is also not preferred because of poor reactivity. The magnesium hydroxide has suitable properties and can produce the modified ionomer resin of the present invention by passing the resin through the extruder once. The magnesium hydroxide may be present in an amount sufficient to neutralize 2 to 30% of the free carboxyl group in the sodium neutralized ionomer resin. For example, an amount of magnesium hydroxide is 0.2 to 1.5 parts by weight based on 100 parts by weight of the sodium neutralized ionomer resin. The amount of magnesium hydroxide is more preferably about 0.3 parts by weight based on 100 parts by weight of the ionomer resin.

In addition to magnesium hydroxide, other additives, such as a pigment, a lubricant, a dispersant, an antioxidant, a stabilizer and an ultraviolet absorber can be added to the ionomer resin.

A portion of the sodium neutralized ionomer resin may be pre-reacted with magnesium hydroxide to form a masterbatch.

INDUSTRIAL APPLICABILITY

The modified ionomer resin obtained as mentioned above is very suitable for a variety of sporting goods. If the modified ionomer resin is applied to a golf ball cover, a golf ball core may be covered with two semi-spherical shells formed from the modified ionomer resin and pressed at an elevated temperature. The modified ionomer resin may cover the core by an injection molding method.

The golf ball covered with the modified ionomer resin of the present invention exhibits excellent durability at a low temperature and does not crack at a temperature of $-30°$ C. The golf ball also has good nomal durability, such as excellent cut-resistance. It, further, has good anti-aging properties.

BRIEF EXPLANATION OF THE DRAWINGS

In FIG. 1, a solid line shows the former and a dotted line shows the latter.

BEST MODE FOR CARRYING OUT THE INVENTION

Figure 1:
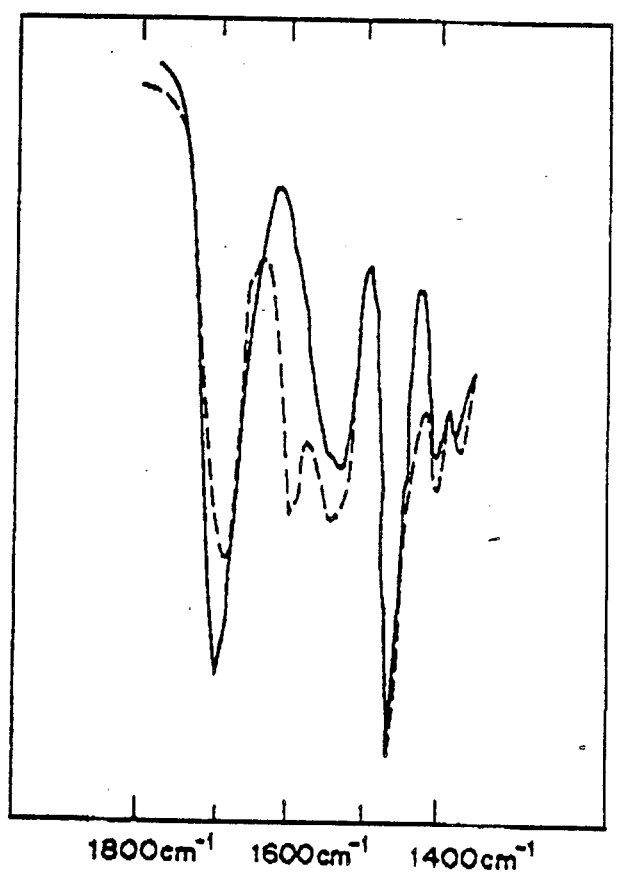
FIG. 1 shows an IR spectra of HI-MILAN 1605 which is not neutralized with magnesium ion and HI-MILAN 1605 which is neutralized with magnesium.

The present invention is illustrated by the following examples.

EXAMPLE 1

A sodium neutralized ionomer resin HI-MILAN 1605, 1707 available from Mitsui Du Pont Polychemical Company) and a magnesium compound were charged in a Bent type extruder having a screw and extruded at 226° C. (nozzle size=50 mm $\phi$, $L/D=28$, vacuum degree=680 mmHg) to form pellets. The pellets were charged in an injection molder and a core of a two piece golf ball was covered with the modified ionomer resin to form a two piece golf ball. A melt index value of the modified resin and physical properties of the obtained golf ball are shown in Table 1.

For a comparison, a combination of HI-MILAN 1605 and 1707, which is not modified with the magnesium ion, was employed to form a two piece golf ball. The golf ball was tested as mentioned above to show in Table 1. The number of the tested golf balls was 12.

Further, IR spectra of HI-MILAN 1605 which are not neutralized with the magnesium ion and HI-MILAN which are neutralized with magnesium, are shown in FIG. 1. In FIG. 1, a dotted line shows the neutralized one and a solid line shows the non-neutralized one.

TABLE 1

| | | | Example 1 | Example 2 | Comparative example 1 | Comparative example 2 | Comparative example 3 | Comparative example 4 |
|---|---|---|---|---|---|---|---|---|
| Cover formulation | Sodium neutralized ionomer resin | Number | 1605 | 1605/1707 = 60/40 | 1605 | 1605/1707 = 60/40 | 1605 | 1557/1706 = 50/50 |
| | | Metal ion | Na | Na/Na | Na | Na/Na | Na | Zn/Zn |
| | | Degree of neutralization | 29 | 41 | 29 | 41 | 29 | 58 |
| | Amount of Mg compound | Mg(OH)$_2$ | 0.75 | 0.51 | — | — | — | — |
| | | MgO | — | — | — | — | 0.51 | — |
| | Neutralization degree of Mg ion | | 15 | 10 | — | — | 15 | — |
| | Melt index (M.I.) | | 1.2 | 1.0 | 2.8 | 2.0 | 1.4 | 2.9 |
| Physical properites of golf ball | Rebound coefficient$^a$ | | 0.785 | 0.784 | 0.784 | 0.785 | 0.783 | 0.767 |
| | Durability of low temperature$^b$ | | No crack at $-30°$ C. | No crack at $-30°$ C. | Two were cracked at $-10°$ C. | Two were cracked at $-20°$ C. | (1) | No crack at $-30°$ C. |
| | Durability of low temperature after leaving at 60° C. for 14 days | | One was cracked at $-30°$ C. | (2) | All were cracked at $-10°$ C. | All were cracked at $-10°$ C. | (3) | No crack at $-30°$ C. |

(1) One was cracked at $-10°$ C. and the remainings were not cracked at $-30°$ C.
(2) No crack was raised at $-10°$ C. and two were cracked at $-20°$ C.
(3) One was cracked at $-20°$ C. and four were cracked at $-30°$ C.

[Method of test]

$^a$ Rebound coefficient: Rebound coefficient is calculated from a speed of a golf ball when a cylindrical item having 198.4 g is collided with a golf ball at 45 m/sec.

$^b$ Durability of low temperature: After leaving a golf ball at a fixed temperature over day and night, the ball is collided five times with a board followed by cooling to the fixed temperature and then collided another five times. This is repeated five times.

I claim:

1. An ionomer resin comprising an ionomer resin product prepared by additionally neutralizing with magnesium hydroxide free carboxyl groups of a sodium neutralized ionomer resin,
   said sodium neutralized ionomer resin being prepared by copolymerizing 96 to 70% by weight of a monoolefin with 4 to 30% by weight of an unsaturated mono- or di-carboxylic acid having 3 to 8 carbon atoms or an ester thereof and neutralizing with sodium, said weight % being based on the total weight of the monomer,
   wherein said magnesium hydroxide is added to said sodium neutralized ionomer resin in an amount sufficient to neutralize 20 to 30% of the free carboxyl groups in said sodium neutralized ionomer resin and mixing at a temperature of from 150° to 250° C.

2. The ionomer resin according to claim 1, wherein the amount of said magnesium hydroxide is 0.2 to 1.5 parts by weight based on 100 parts by weight of said sodium neutralized ionomer resin.

3. The ionomer resin according to claim 1, wherein the amount of said magnesium hydroxide is about 0.3 parts by weight based on 100 parts by weight of said sodium neutralized ionomer resin.

4. A resin product comprising:
   an ionomer resin according to claim 1, and
   an additive selected from the group consisting of pigments, lubricants, dispersants, antioxidants, stabilizers and ultraviolet absorbers.

5. A resin product comprising:
   an ionomer resin according to claim 2, and
   an additive selected from the group consisting of pigments, lubricants, dispersants, antioxidants, stabilizers and ultraviolet absorbers.

* * * * *